United States Patent [19]

Oguro

[11] Patent Number: 4,802,038
[45] Date of Patent: Jan. 31, 1989

[54] PCM AUDIO SIGNAL RECORDING AND/OR REPRODUCING APPARATUS WITH PROGRAM TIMER AND SERIES AND PARALLEL FORMATS

[75] Inventor: Masaki Oguro, Tokyo, Japan

[73] Assignee: Sony Corporation, Tokyo, Japan

[21] Appl. No.: 875,531

[22] Filed: Jun. 18, 1986

[30] Foreign Application Priority Data

Jun. 20, 1985 [JP] Japan .................. 60-135184

[51] Int. Cl.⁴ .................. G11B 5/09; G11B 15/18; G11B 20/10
[52] U.S. Cl. .................. 360/22; 360/19.1; 360/64; 360/69; 360/71; 360/32
[58] Field of Search .................. 360/32, 22, 64, 69, 360/71, 72.1, 23, 18, 19.1, 55

[56] References Cited

U.S. PATENT DOCUMENTS

| | | | |
|---|---|---|---|
| 4,390,906 | 6/1983 | Furomoto et al. | 360/19.1 |
| 4,541,020 | 9/1985 | Kimura | 360/22 |
| 4,542,418 | 9/1985 | Yoneyama et al. | 360/19.1 |
| 4,542,419 | 9/1985 | Morio et al. | 360/19.1 |
| 4,551,771 | 11/1985 | Machida et al. | 360/19.1 |
| 4,558,380 | 12/1985 | Porter | 360/53 |

FOREIGN PATENT DOCUMENTS 0085578 8/1983 European Pat. Off. .
0102600 3/1984 European Pat. Off. .
2030755 4/1980 United Kingdom .

OTHER PUBLICATIONS

8158 Grundig Technische Informationen, pp. 119–128, vol. 28 (1981), No. 3, Regensburg, Deutschland.

Primary Examiner—Raymond F. Cardillo
Assistant Examiner—Surinder Sachar
Attorney, Agent, or Firm—Alvin Sinderbrand

[57] ABSTRACT

In a PCM (pulse code modulated) audio signal recording and/or reproducing apparatus, a scanning track formed by one scanning of a tape by a rotary head is divided into a plurality of track areas in its longitudinal direction to thereby form multi-channel segment track areas, and the PCM audio signal is recorded on and/or reproduced from the segment track area of each track corresponding to a particular channel on the tape. When a plurality of programs or events are sequentially recorded in a timer scheduled recording mode, it is possible to select either a series recording mode in which successive events are recorded only in the segment track areas of one channel or a parallel recording mode, in which the successive events are recorded in segment track areas of different channels, respectively.

1 Claim, 5 Drawing Sheets

PCM AUDIO SIGNAL RECORDING AND/OR REPRODUCING APPARATUS WITH PROGRAM TIMER AND SERIES AND PARALLEL FORMATS

BACKGROUND OF THE INVENTION

Field of the Invention

This invention relates to an apparatus for recording and/or reproducing an information signal, for example, a PCM (pulse code modulated) audio signal, by means of a rotary head which scans skewed tracks on a tape.

Description of the Prior Art

It is well known in the prior art that a plurality of broadcast programs or events, such as, FM (frequency modulated) audio broadcast programs or television broadcast programs, each having a different broadcast time, can be sequentially recorded by an audio tape recorder or a video tape recorder (VTR) by using a timer incorporated therein for controlling the recorder operation.

Both in the case of the audio tape recorder and in the case of the video tape recorder, the recording mode thereof is such that the plurality of broadcast programs are sequentially and successively recorded on the tape along its longitudinal direction (hereinafter simply referred to as a series recording mode).

In the case of the so-called audio 8-track cassette tape player, 8 recording tracks are arranged parallel to one another across the width of the tape, and the recording mode (hereinafter simply referred to as a parallel recording mode) is such that successive events are recorded in different tracks. However, such 8-track player, as available on the market, does not permit a plurality of broadcast programs scheduled by a timer (hereinafter simply referred to as timer scheduled broadcast programs) to be sequentially recorded in the 8 parallel tracks in the sequential order of scheduled broadcast times, that is, with each broadcast program or event being recorded in a respective one of the tracks.

The above mentioned series recording mode or system has the advantage that the plurality of broadcast programs recorded under the control of the timer can be viewed successively. On the contrary, the series recording system is disadvantageous in that, when only one of the recorded broadcast programs is to be reproduced, the playback start point of the corresponding program must be detected, that is, a random access operation must be carried out. Further, the total recording time or capacity for all of the programs recorded in the series mode is only the recording time corresponding to one length of the tape. Therefore, if any of the programs to be recorded is of long duration, the number of the programs to be recorded by the timer scheduled recording system is restricted by the tape length.

On the other hand, in the case of the parallel recording mode, if the timer scheduled recording is possible, each program is recorded in the respective track from the leading end portion of the tape in its longitudinal direction so that, upon playback, random access operation to detect the start of the program becomes unnecessary. Further, since each recorded program can correspond in length to the length of the tape, regardless of the duration of each program to be recorded, it becomes possible in the timer scheduled recording mode to record a number of programs equal at least to the number of tracks. In addition, there is the further advantage that musical programs can be recorded in selected tracks in accordance with their respective musical genres, such as jazz music, classical music and so on.

However, the parallel recording mode is disadvantageous in that, since the plurality of programs are not recorded continuously in one track contrary to the series recording mode, in the playback mode, the tape must be rewound at the conclusion of each program, that is, the programs can not be viewed successively without interruption.

Furthermore, there is no known recording and/or reproducing apparatus which can carry out timer scheduled recording in the parallel recording mode.

OBJECTS AND SUMMARY OF THE INVENTION

Accordingly, it is an object of this invention to provide an improved PCM (pulse code modulated) audio signal recording and/or reproducing apparatus which avoids the above described problems associated with the prior art.

It is another object of this invention to provide a PCM audio signal recording and/or reproducing apparatus which can selectively carry out a recording operation in the series mode and/or the parallel mode.

It is a further object of this invention to provide a PCM audio signal recording and/or reproducing apparatus, as aforesaid, which can carry out recording operations scheduled by a timer in either the series recording mode or the parallel recording mode.

According to an aspect of the present invention, there is provided a PCM audio signal recording and/or reproducing apparatus in which a record track formed by each scanning of the tape by a rotary head is separated into a plurality of track areas in its longitudinal direction to thereby form multi-channel segment track areas and the PCM audio signal is recorded in and/or reproduced from each of the track areas corresponding to each channel on the tape. This apparatus can employ selectively a series recording mode in which the recording is effected in only the track areas of one channel, or a parallel recording mode in which the recording of successive events is sequentially carried out in the track areas of different channels.

It is a further feature of the apparatus embodying the invention that, when the program to be recorded is set by the timer scheduled recording system, either the series recording mode or the parallel recording mode is selected on the basis of the contents of the event to be programmed, the elapsed time of such event and so on. Accordingly, the advantages of both the series recording mode and the parallel recording mode can be effectively realized in the case of the timer scheduled recording system.

The above, and other objects, features and advantages of the present invention, will become apparent from the following detailed description of a preferred embodiment which is to be read in conjunction with the accompanying drawings, throughout which the same reference numerals designate corresponding elements and parts.

DESCRIPTION OF THE PREFERRED EMBODIMENT

In a PCM audio signal recording and/or reproducing apparatus according to an embodiment of this invention hereinafter described in detail, an audio signal is recorded in the timer scheduled recording mode by a so-called 8 mm video tape recorder which can also be used as a PCM audio tape recorder. A suitable recorder of this type is disclosed in detail in U.S. Pat. No. 4,542,419, having a common assignee herewith, and which is incorporated by reference herein.

First, it is to be noted that such 8 mm video tape recorder can employ a recording mode in which an audio signal is frequency-modulated, mixed with a color video signal and then recorded in such a way that the frequency-modulated audio signal can be separated from the color video signal on the basis of its frequency. The 8 mm video tape recorder has an alternative recording mode in which the audio signal is pulse-code-modulated and recorded in an overscan area of each track separate from the main track area receiving the color video signal, with both signals forming one track.

Figure 1:
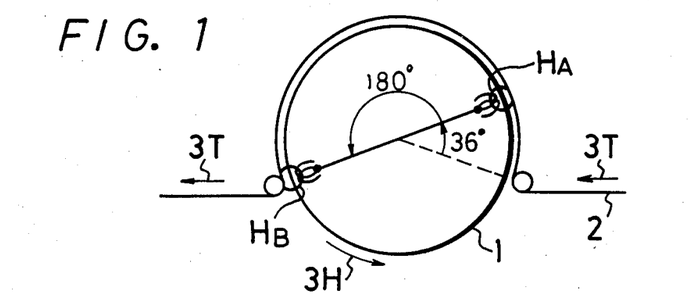
FIG. 1 is a schematic diagram showing one example of a rotary head assembly used in a recording/reproducing apparatus embodying this invention.

FIG. 1 shows that a rotary head assembly of an 8 mm video tape recorder includes recording and reproducing rotary magnetic heads HA and HB, respectively. Rotary magnetic heads HA and HB have respective gaps with different azimuth angles and are mounted on a rotary drum 1 with an angular spacing of 180° therebetween. These rotary magnetic heads HA and HB are rotated at a frame frequency (30 Hz) in the direction indicated by an arrow 3H, and protrude slightly from the peripheral surface of rotary drum 1. A magnetic tape 2 is wrapped around the peripheral surface of the rotary drum 1 over an angular extent larger than 216° and is suitably transported at a constant speed in the direction indicated by arrow 3T during recording and reproducing operations.

Figure 2:
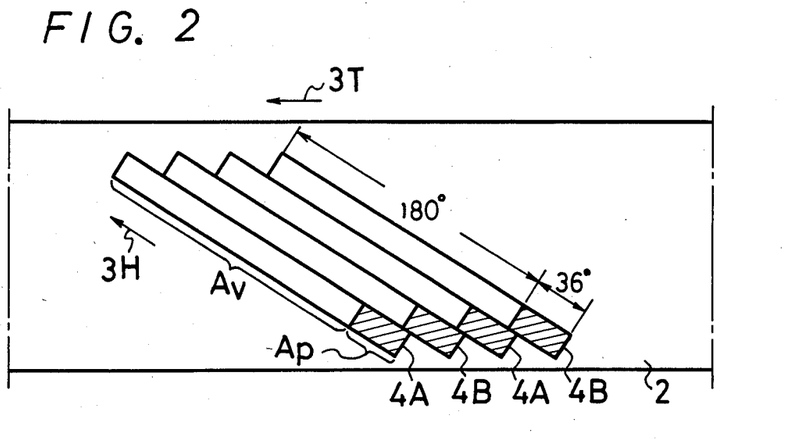
FIG. 2 is a schematic diagram showing an example of a recording track pattern formed on a length of tape by the rotary head assembly shown in FIG. 1 when in a normal recording mode.

Accordingly, record tracks 4A and 4B, each having a length corresponding to a wrap angel of 216° on drum 1, are alternately formed by rotary heads HA and HB, as shown in FIG. 2. In an overscan area AP of each track having an angular extent of about 36° (including a margin used for recording a PCM audio signal in the after-recording mode and a guard band) measured from the point at which the rotary heads HA and HB start scanning the tracks 4A and 4B, there is recorded an audio signal corresponding to one field period of the video signal and which is pulse-code-modulated and time compressed. On a succeeding area AV of each track corresponding to an angular extent of 180°, there are recorded a color video signal of one field period, an FM (frequency modulated) audio signal and a tracking signal.

Figure 3:
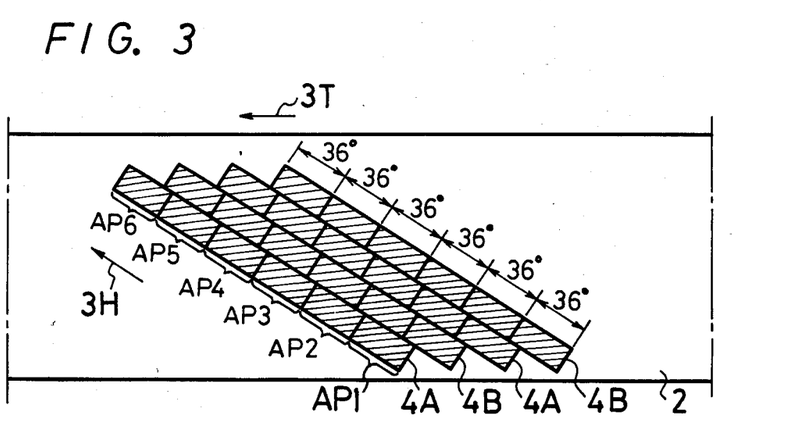
FIG. 3 is a schematic diagram showing an example of a recording track pattern formed on the tape in an audio-use mode to which the present invention is applied.

Alternatively, and as disclosed in detail in previously noted U.S. Pat. No. 4,542,419, it is possible to establish a so-called audio-use mode in which the area AV of each track corresponding to the angular range of 180° is divided equally by 5 and the PCM audio signal is recorded in a selected one of these divided portions during scanning of each track. Specifically, as shown in FIG. 3, the whole area of each track, including the area AP and the area AV, is divided into 6 track areas AP1 to AP6, each corresponding to an angular range of 36°, and first to sixth track channels are formed by the same numbered segments or track areas AP1 to AP6 of the respective skewed tracks 4A,4B,4A,4B, etc., whereby a suitably time-compressed PCM audio signal can be recorded in any desired channel. For example, the PCM audio signal may be recorded first in the segments or track areas AP1 of the successive tracks 4A,4B from one end of the tape to the other. Thereafter, the PCM audio signal may be further recorded in segments or track areas AP2 of the successive tracks from one end of the tape to the other. Accordingly, PCM audio signals can be recorded in and reproduced from each of the six channels with the result that, in the audio-use mode shown on FIG. 3, the tape 2 has a recording time or capacity six times as long as when a PCM audio signal is recorded only in the overscan area AP of each track, as on FIG. 2.

When the 8 mm video tape recorder is employed in its audio-use mode, as described above with reference to FIG. 3, if only one track area of of each track is used for recording successive events or programs, series recording cam be effected in each channel. For example, if a PCM audio signal is recorded only in the areas AP2 of successive tracks along the entire tape, different events 1,2 and 3 are sequentially, or series recorded, as shown in FIG. 4B.

Figure 4A:
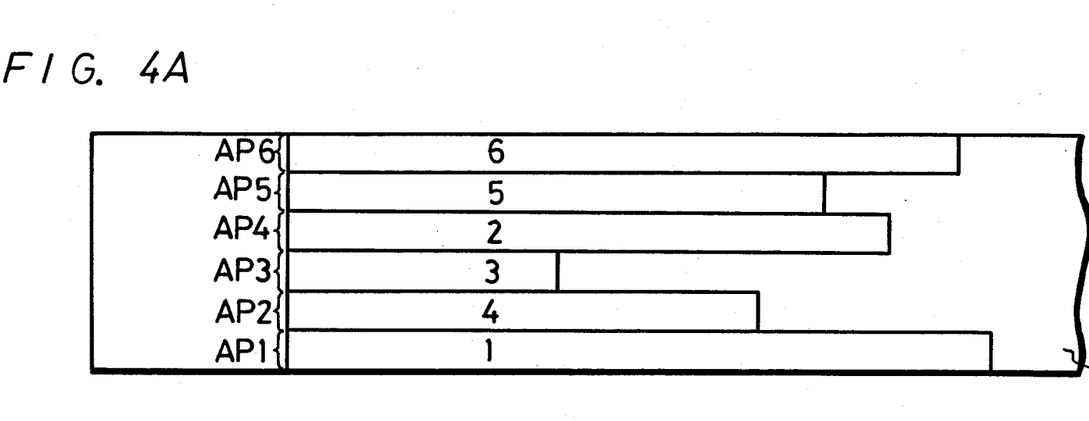
FIGS. 4A and 4B are schematic diagrams illustrating the parallel and series recording modes, respectively.
Figure 4B:
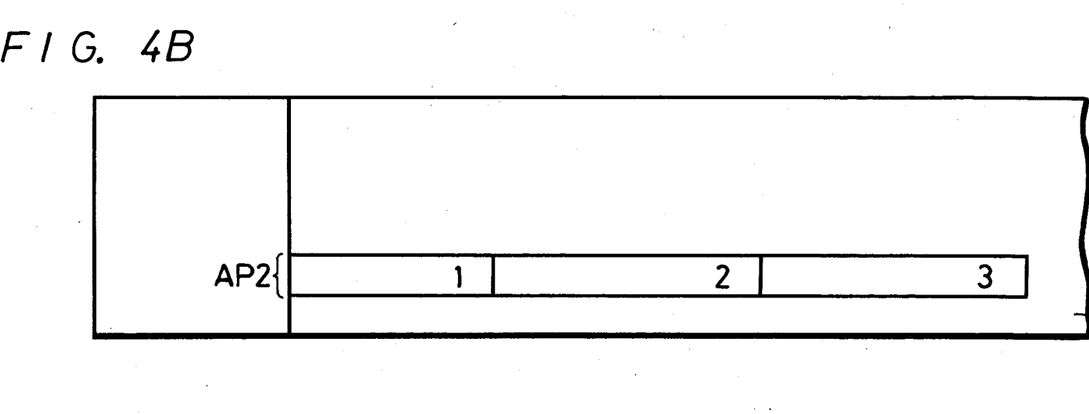

On the other hand, if track areas AP1 to AP6 of the plurality of channels are all employed, six events, 1,2,3,4,5 and 6 may be sequentially recorded in the areas AP1 to AP6, respectively, of the successive tracks, as shown in FIG. 4A, so that a parallel recording mode is made possible.

Although the present invention is being here described as applied to a video signal recording and/or reproducing apparatus which has an alternative audio-use mode, it will be apparent that the invention may be applied as well to a PCM audio tape recorder which is only capable of recording and/or reproducing an audio signal.

The timer scheduled recording operation will now be described.

First, to set the timer scheduled recording, a timer set button (not shown) is depressed to place the apparatus in the timer schedule recording mode. There are three recording modes that are possible with timer scheduled recording, namely: the above mentioned parallel recording of the PCM audio signal; the series recording of the PCM audio signal; and the normal recording mode of the 8 mm video tape recorder for recording the video signal in the area Av of each track and the PCM audio signal in the area Ap. When the 8 mm video tape recorder is used as an audio tape recorder, that is, in the audio-use mode, the video signal recording and/or reproducing mode is not available.

Therefore, a desired recording mode is selected by switching a recording mode change-over switch 30 (FIG. 5) which will be further described later.

In the timer scheduled recording mode embodying this invention, if the recording mode change-over switch is changed-over from its present position to another position, items of information converning the events or programs previously scheduled by the timer and stored in a memory are all erased.

If the normal recording mode of the 8 mm video tape recorder is selected, the area of each track for recording of the PCM audio signal is determined to be the area AP1 and other areas can not be specified. In the parallel recording mode, any of the track areas can be specified for each event or program. In other words, recording of an event in any one of the channels corresponding to areas AP1 to AP6 can be specified.

On the other hand, in the series recording mode, although an arbitrary one of the track areas can be specified a different track area can not be specified for each program or event. In other words, a plurality of events are recorded in only one channel, for example, the channel corresponding to track areas AP2.

After one of these three modes (that is, the normal, parallel and series modes) is scheduled and selected by the timer, changing of the selected mode to another mode (for example, scheduling the parallel audio signal recording mode until a certain time and then scheduling the normal video recording mode until a next predetermined time, etc.) is complicated for the user to set up, but it is possible to change the selected recording mode to another recording mode, if necessary.

When time scheduled recording is selected, data indicative of a selected one of the above mentioned three recording modes is stored in the memory and also the event NO. (number) is indicated on the display section of the timer section. In the timer of this kind, the event NO. is determined in response to the number of events (programs) that can be scheduled and the address of a memory of the timer is determined for each event NO. At such address, there are stored items to be set, such as, scheduled time, recording time, TV broadcasting channel and so on. The event NO. can be changed manually. After the event NO. is determined, the segment track or channel NO. for the item to be set is next determined and such channel NO. is indicated on the display section of the timer.

In the parallel recording mode, the channel NO. is changed for every event or program, as described before, whereas, in the series recording mode, the channel NO. selected for the first event is not changed thereafter. Further, in the normal recording mode, only channel NO. 1 indicative of the area AP1 is indicated.

Next, the day and the starting time of the event or program are set and, thereafter, the time that the event is scheduled to end is set. This concludes the setting operations for the timer scheduled recording of one event. In like manner, a plurality of events may be set by the timer scheduled recording system.

More specifically, in the parallel recording, the event NO. is selected and then changed for each of the successive events. Also, the channel NO. is selected for the first event or program and then changed for the succeeding events. Thereafter, the timer scheduled recording start time and so on are set for each event.

When the series recording mode and the normal recording mode are selected, the event NO. is changed for each of the successive events or programs and the channel NO. for the first event is indicated on the display section of the timer section. Thereafter, the channel NO. is not changed and the operation is moved to the next step in which the timer scheduled recording start time is set.

The operation of the timer scheduled recording system with respect to the plurality of events that are scheduled by the timer will be later described in greater detail.

Figure 5:
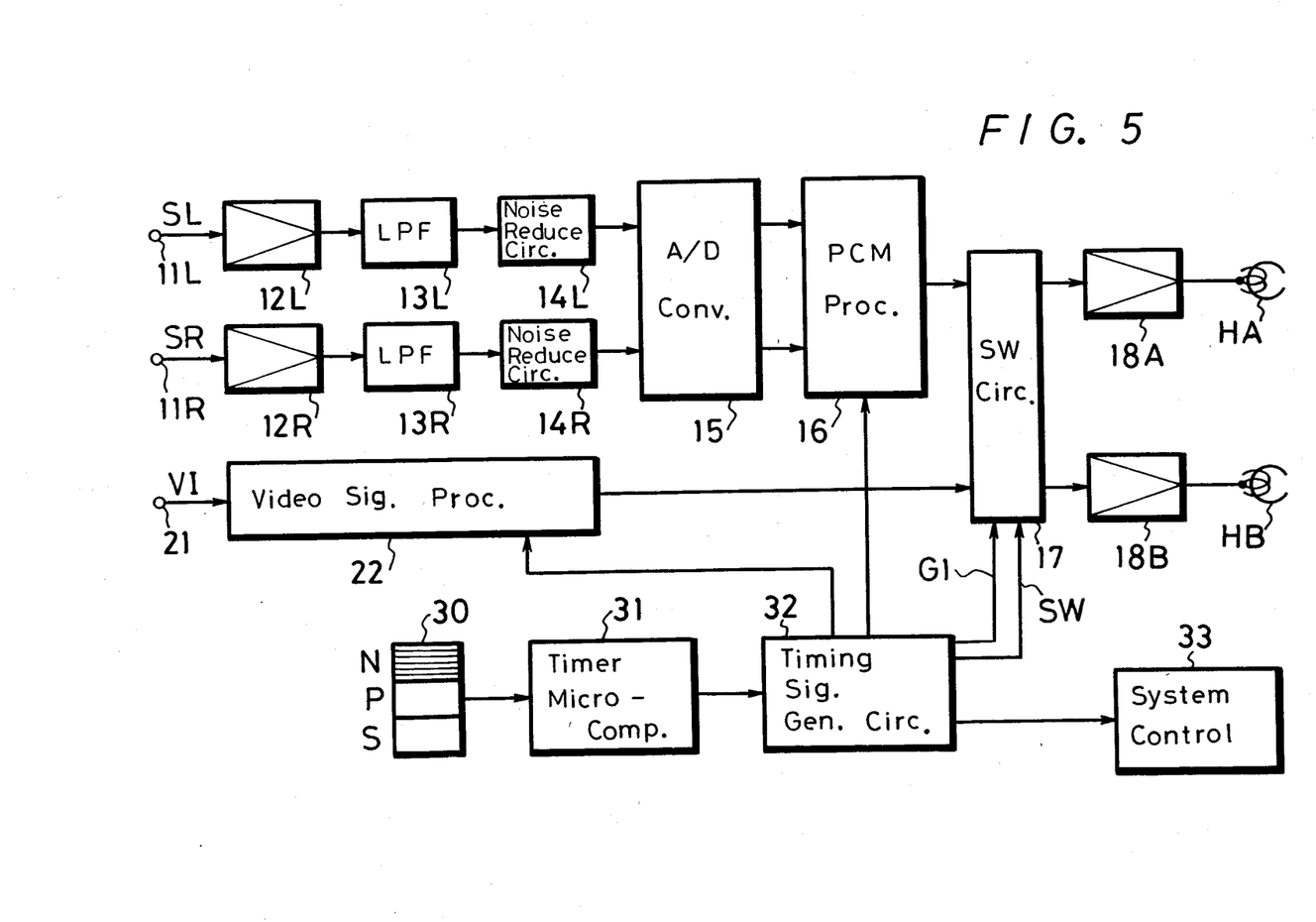
FIG. 5 is a block diagram showing an embodiment of a recording system of a PCM audio signal recording and/or reproducing apparatus according to an embodiment of this invention.

Referring now to FIG. 5, it will be seen that, in a recording system of an 8 mm video tape recorder embodying this invention, left and right stereo audio signals SL and SR applied to input terminals 11L and 11R are supplied to amplifiers 12L and 12R, respectively. The output signals from the amplifiers 12L and 12R are supplied through band-limiting low-pass filters 13L and 13R and noise reduction circuits 14L and 14R to an E/D (analog-to-digital) converter 15 in which they are converted to digital signals. The digital signals from A/D converter 15 are supplied to a PCM processor 16 in which the audio signal data of one field period is time compressed to a signal corresponding to one track area AP, subjected to the addition of an error correction code and a 10/8 bit conversion, and so on. Thereafter, the data is read out from PCM processor 16 on the basis of a read control signal derived from a timing signal generating circuit 32 and then supplied to a switching circuit 17.

A video signal VI is supplied through an input terminal 21 to a video signal processor 22 in which the luminance signal is frequency modulated and the carrier chrominance signal is low-frequency converted. Then a composite signal composed of the FM luminance signal and the frequency converted carrier chrominance signal is supplied to switching circuit 17.

Switching circuit 17 is controlled in its switching operation by a suitable switching signal and a gating signal from timing signal generating circuit 32. Accordingly, an output signal from video signal processor 22 or an output signal read out from PCM processor 16 is supplied through amplifiers 18A and 18B to rotary heads HA and HB.

Though not shown in detail, within PCM processor 16 and video signal processor 22, an ID (identification) pilot signal for indicating whether the recording track pattern is recorded in the normal video format (FIG. 2) or in the multi-channel PCM audio mode (FIG. 3), and a pilot signal for the tracking of the rotary heads HA and HB are suitably composed with the composite color video signal and these pilot signals are suitably detected and used in the playback mode.

The timing signal generating circuit 32 is supplied with a command signal from a timer microcomputer 31 so that, in the timer operation mode, a control signal corresponding to the command signal issued from timer microcomputer 31 is generated from the timing signal generating circuit 32. This control signal is also supplied to a system controller 33 by which, in the timer operation mode, various operations, such as the rewinding operation, stop operation, and so on, of the apparatus are controlled.

The recording mode change-over switch 30 is provided to select the normal recording mode when in the position indicated at N, the parallel recording mode when in the position indicated at P and the series recording mode when in the position indicated at S. A recording mode signal from this recording mode change-over switch 30 is supplied to timer microcomputer 31 having a memory in which, in the timer scheduled recording mode, such recording mode signal is stored. In such memory of timer microcomputer 31, there are also stored the previously described timer scheduled setting items.

Figure 6A:
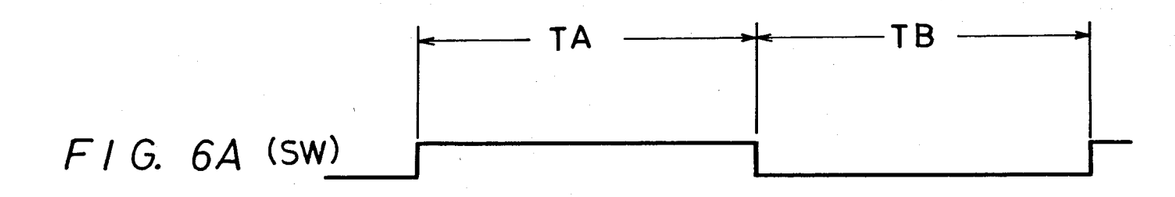
FIGS. 6A to 6G are timing charts to which reference will be made in explaining the operation of the apparatus shown in FIG. 5.

In the normal recording mode, when the time set by the timer is reached, each circuit section shown in FIG. 5 is powered and a signal SW (FIG. 6A), which inverts its state at each of the periods TA and TB in which the rotary heads HA and HB, respectively, scan the area AV on the tape, is supplied from timing signal generating circuit 32 to switching circuit 17. As a result, the video signal from the video signal processor 22 is alternately distributed to rotary heads HA and HB and thereby the video signal of one field period is sequentially recorded in the area AV of each of the tracks 4A and 4B.

Figures 6B, 6C, 6D:
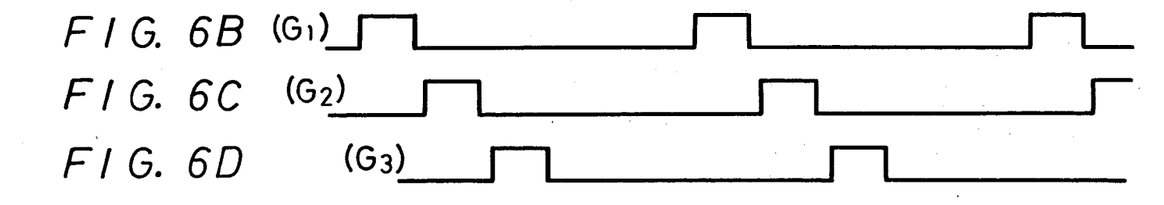

From the timing signal generating circuit 32, there is also generated a signal G1 (FIG. 6B) which becomes "1" when the one of the rotary heads which is then not scanning the area AV, scans the area AP1. This signal G1 is also supplied to switching circuit 17. Also, during the period in which signal G1 becomes "1", a control signal for reading out the time-compressed PCM audio signal is generated by timing signal generating circuit 32 and is supplied to the PCM processor 16, whereby the PCM audio signal is supplied to the rotary head which then scans the area AP1. As a result, and as shown on FIG. 2, in the normal recording mode, the video signal is recorded on the area AV, and the PCM audio signal is recorded on the area AP1 of each track 4A,4B on the tape 2.

When the set time for the end of the event or program being recorded is sensed by the timer, the recording and/or reproducing apparatus is placed in the stop mode and then in a recording standby mode.

When the timer senses the set starting time of the next event or program to be recorded, the video signal and PCM audio signal of such next event are recorded in the timer scheduled recording mode as described above.

Figure 7:
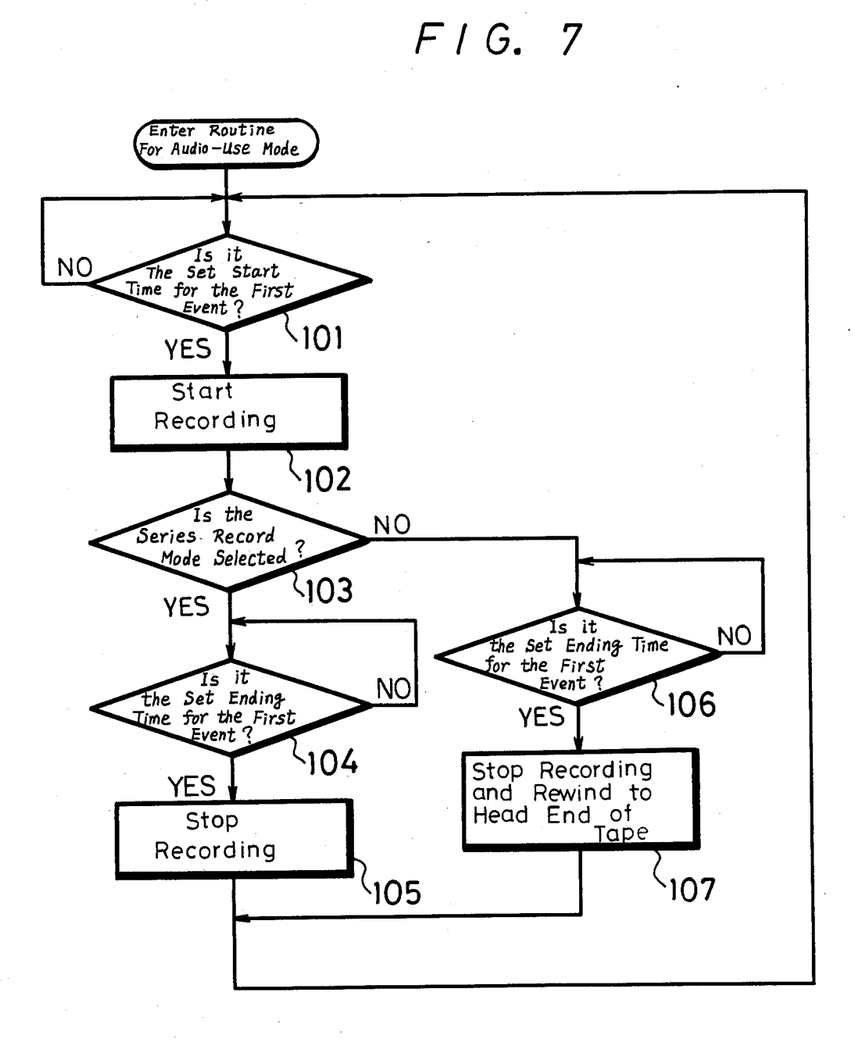
FIG. 7 is a flow chart to which reference will be made in explaining timer scheduled recording by the apparatus according to this invention.

The operations of the timer microcomputer 31 and associated components for the timer scheduled recording of only the PCM audio signal, that is, in the parallel recording audio-use mode or the series recording audio-use mode, will be described with reference to the flow chart of FIG. 7.

Figure 6E:
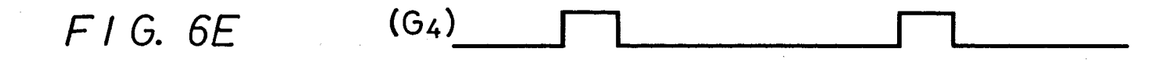
Figure 6F:
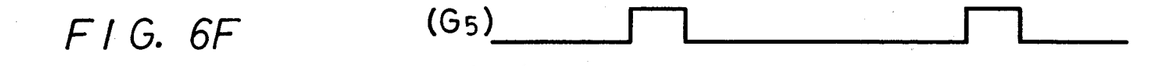
Figure 6G:
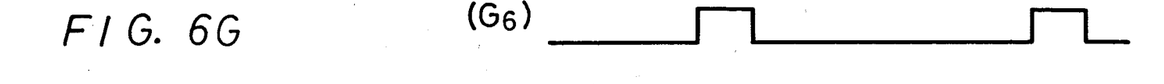

Upon entering the routine for the audio-use mode in either the parallel recording mode or the series recording mode, the arrival of the set starting time of the first event is determined in step 101, and leads to the start of recording in step 102. At that time, in response to a signal identifying the track area AP1–AP6 preset or selected for that event and stored in the memory, timing signal generating circuit 32 generates a signal which becomes "1" when each of the rotary heads HA and HB scans that selected area of the respective track. More specifically, if the area AP1 has been selected, the signal G1 (FIG. 6B) is generated; for the area AP2, a signal G2 (FIG. 6C) is generated; for the area AP3, a signal G3 (FIG. 6D) is generated; for the area AP4, a signal G4 (FIG. 6E) is generated; for the area AP5, a signal G5 (FIG. 6F) is generated; and the area AP6, a signal G6 (FIG. 6G) is generated. The one of these signals G1 to G6 corresponding to the track area or channel selected for the event to be recorded is supplied to PCM processor 16 as the read control signal and to the switching circuit 17 as the gating control signal.

Accordingly, the PCM audio data of the first event or program is recorded in the area AP1–AP6 of each track which has been selected in the timer scheduled recording mode for that event.

Next, in the time scheduled recording mode, whether or not the series recording mode has been selected is determined in step 103 from the contents stored in the memory of timer microcomputer 31. If it is determined that the series recording mode has been selected, the program proceeds to the next step 104 in which recording is continued until the timer senses the arrival of the time set for the end of the first event. When the end of the recording time for the first event is detected, a control signal is supplied in step 105 from timing signal generating circuit 32 to system controller 33 to stop the running of tape 2 and thereby halt the recording operation.

Thereafter, the program returns to step 101, and the above-described operations are repeated for each of the following events or programs to be recorded. In other words, in the same track areas as the preceding event, there is recorded the next event or program which succeeds the preceding event. For example, if the selected track area is the track area AP2, the events, 1,2 and 3 are sequentially recorded on the track areas AP2 of the successive tracks, as shown in FIG. 4B.

On the other hand, if, at step 103, it is determined that the series recording mode was not selected, that is, the parallel recording mode was selected, the program proceeds from step 103 to step 106 in which recording is continued until the timer senses the arrival of the time set for the end of the first event or program. Thereupon, in step 107, the control signal is supplied from timing signal generating circuit 32 to system controller 33 by which recording is halted and the tape 2 is rewound to its head end and there maintained at rest. Once again, the program returns to step 101 and the above-described operations are repeated for recording of the next event. In the case of the parallel recording mode, at step 102, based upon the track area AP1–AP6 selected for recording of that next event, the respective one of the signals G1–G6 is supplied to PCM processor 16 and to switching circuit 17 from timing signal generating circuit 32. Therefore, in the parallel recording mode, as described above, PCM audio signals for a plurality of events or programs are recorded on tape 2, with the track area being changed for each of the events 1–6, for example, as shown in FIG. 4A.

Although in the above described embodiment of the invention, when setting the timer scheduled recording mode, the series recording mode or the parallel recording mode is selected first, that is not necessary. Therefore, the selection of the series recording mode or the parallel recording mode may be made after the starting times, the ending times and so on for the plurality of events have been set. In that case, for the series recording mode, one track area is determined or selected. However, for the parallel recording mode, the track area is not predetermined for each event. Rather, in the timer operation mode, the timer microcomputer 31 may automatically change the track area for each event, to select the track area AP1 for event NO.1 and then to change to the track area AP2 for event NO. 2, . . . , and so on.

According to the present invention as set forth above, since both the series recording mode and the parallel recording mode can be employed for the timer scheduled recording, if either the series recording mode or the parallel recording mode is properly selected in accordance with the use, and the sources of the signals to be recorded, it is possible to carry out timer scheduled recording while enjoying the respective advantages of both the series recording mode and the parallel recording mode.

Further, according to the present invention, all timer scheduled recording items set for a particular recording mode can be erased merely by switching the change-over switch 30 which is used to select the series recording mode and the parallel recording mode, so that the new items for the events to be scheduled can be advantageously set by the timer with great ease.

Although a single preferred embodiment of the invention has been described above with reference to the accompanying drawings, it will be apparent that the invention is not limited to that precise embodiment, and that many modifications and variations could be effected therein by one skilled in the art without departing from the spirit or scope of the invention as defined by the appended claims.

What is claimed is:

1. A PCM audio signal recording and/or reproducing apparatus in which each of a plurality of recording tracks formed by a rotary head scanning across a magnetic tape is divided by an integer n greater than 1 in the longitudinal direction thereof to thereby form n track areas in each track corresponding to n channels, respectively, and in which an information signal can be recorded in and/or reproduced from each track area of each of said channels; said PCM audio signal recording and/or reproducing apparatus comprising:

timer means for scheduling starting and ending times for a plurality of successively occurring events, said timer means including memory means for storing data concerning said successively occurring events including said starting and ending times; and means for selectively establishing one of a first audio recording mode in which said plurality of events are recorded temporally and spatially in series, between the respective scheduled starting and ending times, in track areas corresponding to only one of said n channels, and a second audio recording mode in which said events are recorded temporally in series and spatially in parallel, between the respective scheduled starting and ending times, in track areas respectively corresponding to ones of said n channels which are different from each other, said means for selectively establishing said first and second recording modes including switch means adapted ot be changed-over between positions corresponding to said first and second recording modes, said data previously stored in said memory means being erased in response to change-over of said switch means between said positions.

* * * * *